US012635611B2

(12) United States Patent
Miller

(10) Patent No.: US 12,635,611 B2
(45) Date of Patent: May 26, 2026

(54) PIVOTING COMBINE HEADER TRANSPORT TRAILER

(71) Applicant: Jeffrey D. Miller, Republic, OH (US)

(72) Inventor: Jeffrey D. Miller, Republic, OH (US)

( * ) Notice: Subject to any disclaimer, the term of this patent is extended or adjusted under 35 U.S.C. 154(b) by 514 days.

(21) Appl. No.: 18/174,302

(22) Filed: Feb. 24, 2023

(65) Prior Publication Data

US 2023/0263097 A1      Aug. 24, 2023

Related U.S. Application Data

(60) Provisional application No. 63/313,406, filed on Feb. 24, 2022.

(51) Int. Cl.
*A01D 75/00*      (2006.01)
*B62D 63/06*      (2006.01)

(52) U.S. Cl.
CPC ........... *A01D 75/002* (2013.01); *B62D 63/06* (2013.01)

(58) Field of Classification Search
CPC .... A01B 73/00; A01D 41/145; A01D 75/002; B62D 21/20; B62D 63/06; B60P 3/066; B60P 1/34; B60P 3/06; B60P 3/07; B61D 47/005
See application file for complete search history.

(56) References Cited

U.S. PATENT DOCUMENTS

| | | | | | |
|---|---|---|---|---|---|
| 1,910,398 | A | * | 5/1933 | Ludington | ............ B60P 1/6418 |
| | | | | | 410/1 |
| 2,544,113 | A | * | 3/1951 | Snead | ...................... B60S 13/02 |
| | | | | | 104/45 |

| | | | | | |
|---|---|---|---|---|---|
| 3,356,301 | A | * | 12/1967 | Barber | ................. A01C 15/005 |
| | | | | | 222/167 |
| 3,490,389 | A | * | 1/1970 | Brown | ..................... B61D 3/04 |
| | | | | | 410/1 |
| 3,576,267 | A | * | 4/1971 | Blevins | ................... B60P 1/483 |
| | | | | | 414/563 |
| 3,757,972 | A | * | 9/1973 | Martin | .................... B60P 3/062 |
| | | | | | 414/537 |
| 3,884,158 | A | * | 5/1975 | Rumell | ................ B65G 63/025 |
| | | | | | 410/1 |
| 4,109,809 | A | * | 8/1978 | Clark | ...................... B60P 3/062 |
| | | | | | 410/1 |
| 4,286,918 | A | * | 9/1981 | Shannon | ................... B60P 3/00 |
| | | | | | 414/742 |
| 4,373,856 | A | * | 2/1983 | Taylor | ..................... B60F 1/043 |
| | | | | | 298/17.7 |
| 4,880,341 | A | * | 11/1989 | Van Den Pol | ........... B61D 3/04 |
| | | | | | 410/1 |

(Continued)

FOREIGN PATENT DOCUMENTS

| | | | | | |
|---|---|---|---|---|---|
| DE | | 19733218 | C2 | * | 7/1999 ............... B61D 3/18 |
| DE | | 10137407 | A1 | * | 2/2003 ............. E02D 3/026 |

(Continued)

*Primary Examiner* — Joseph M Rocca

(74) *Attorney, Agent, or Firm* — Jacob M. Ward; Ward Law Office LLC

(57) ABSTRACT

Embodiments of the present disclosure may include a combine header transport trailer, including a header cart with a frame, a vertical axis, a header mount, and a pivot body. The header mount is configured to rotate about the vertical axis of the header cart between a rear loading position and a side loading position.

19 Claims, 7 Drawing Sheets

(56) References Cited

U.S. PATENT DOCUMENTS

| | | | | |
|---|---|---|---|---|
| 5,393,191 A * | 2/1995 | Alexander | B60P 1/43 | |
| | | | | 414/537 |
| 5,476,353 A * | 12/1995 | Mola | A01K 45/005 | |
| | | | | 414/508 |
| 5,540,538 A * | 7/1996 | Head, Sr. | B60P 3/122 | |
| | | | | 298/5 |
| 5,641,026 A * | 6/1997 | Balmer | A01B 61/046 | |
| | | | | 172/311 |
| 5,715,893 A * | 2/1998 | Houck | A01B 73/005 | |
| | | | | 172/311 |
| 5,816,765 A * | 10/1998 | Pijanowski | B60P 3/122 | |
| | | | | 414/480 |
| 5,879,123 A * | 3/1999 | Blaikie | B60P 1/435 | |
| | | | | 414/537 |
| 6,006,971 A * | 12/1999 | Coleman | B60R 9/00 | |
| | | | | 224/310 |
| 6,047,989 A * | 4/2000 | Wood | B62D 63/06 | |
| | | | | 280/789 |
| 6,086,082 A * | 7/2000 | Andol | B60P 3/062 | |
| | | | | 414/483 |
| 6,123,499 A * | 9/2000 | Thornton | B60P 3/122 | |
| | | | | 414/480 |
| 6,213,034 B1 * | 4/2001 | Raducha | A01B 73/005 | |
| | | | | 172/776 |
| 6,238,170 B1 * | 5/2001 | Pingry | A01B 73/005 | |
| | | | | 414/703 |
| 6,253,976 B1 * | 7/2001 | Coleman | B60R 11/06 | |
| | | | | 224/310 |
| 6,321,852 B1 * | 11/2001 | Pratt | A01B 73/005 | |
| | | | | 111/59 |
| 7,017,676 B2 * | 3/2006 | Neufeld | A01B 73/005 | |
| | | | | 172/776 |
| 7,267,392 B1 * | 9/2007 | Rounds | B60P 3/07 | |
| | | | | 410/1 |
| 7,340,811 B2 * | 3/2008 | Anderson | A61G 21/00 | |
| | | | | 414/533 |
| 7,416,196 B2 * | 8/2008 | Brown | B62B 3/04 | |
| | | | | 108/142 |
| 8,403,353 B2 * | 3/2013 | Fink | B60P 3/1033 | |
| | | | | 280/789 |
| 9,533,612 B2 * | 1/2017 | Meenen | B60P 1/00 | |
| 9,669,747 B2 * | 6/2017 | Turba | B60S 13/02 | |
| 10,188,022 B2 * | 1/2019 | Meenen | A01B 73/005 | |
| 10,377,289 B2 * | 8/2019 | Gentile | B60P 1/32 | |
| 11,358,658 B2 * | 6/2022 | Baker | B62D 24/00 | |
| 11,510,522 B1 * | 11/2022 | Sanford | A47J 37/043 | |
| 2004/0120799 A1 * | 6/2004 | Kessler | B60P 3/062 | |
| | | | | 414/537 |
| 2004/0134674 A1 * | 7/2004 | Skorez | E03B 9/08 | |
| | | | | 173/192 |
| 2005/0069403 A1 * | 3/2005 | Holman | B60P 3/122 | |
| | | | | 414/482 |
| 2005/0173601 A1 * | 8/2005 | Hestand | B60P 1/02 | |
| | | | | 248/129 |
| 2006/0245877 A1 * | 11/2006 | Stabeno | B60P 3/07 | |
| | | | | 414/483 |
| 2010/0092271 A1 * | 4/2010 | Richardson | B60P 3/07 | |
| | | | | 414/537 |
| 2015/0056049 A1 * | 2/2015 | Honigsberg | B60P 3/06 | |
| | | | | 414/539 |
| 2015/0342111 A1 * | 12/2015 | Meenen | A01D 75/002 | |
| | | | | 414/812 |
| 2020/0130558 A1 * | 4/2020 | Verhulp | B60P 3/127 | |
| 2020/0375106 A1 * | 12/2020 | Seiders, Jr | A01D 41/145 | |
| 2023/0063637 A1 * | 3/2023 | Boydstun, IV | B60P 3/08 | |

FOREIGN PATENT DOCUMENTS

| | | | | |
|---|---|---|---|---|
| DE | 102006013250 A1 * | 10/2006 | | B60P 1/28 |
| DE | 102011100145 A1 * | 10/2012 | | B62D 63/06 |

* cited by examiner

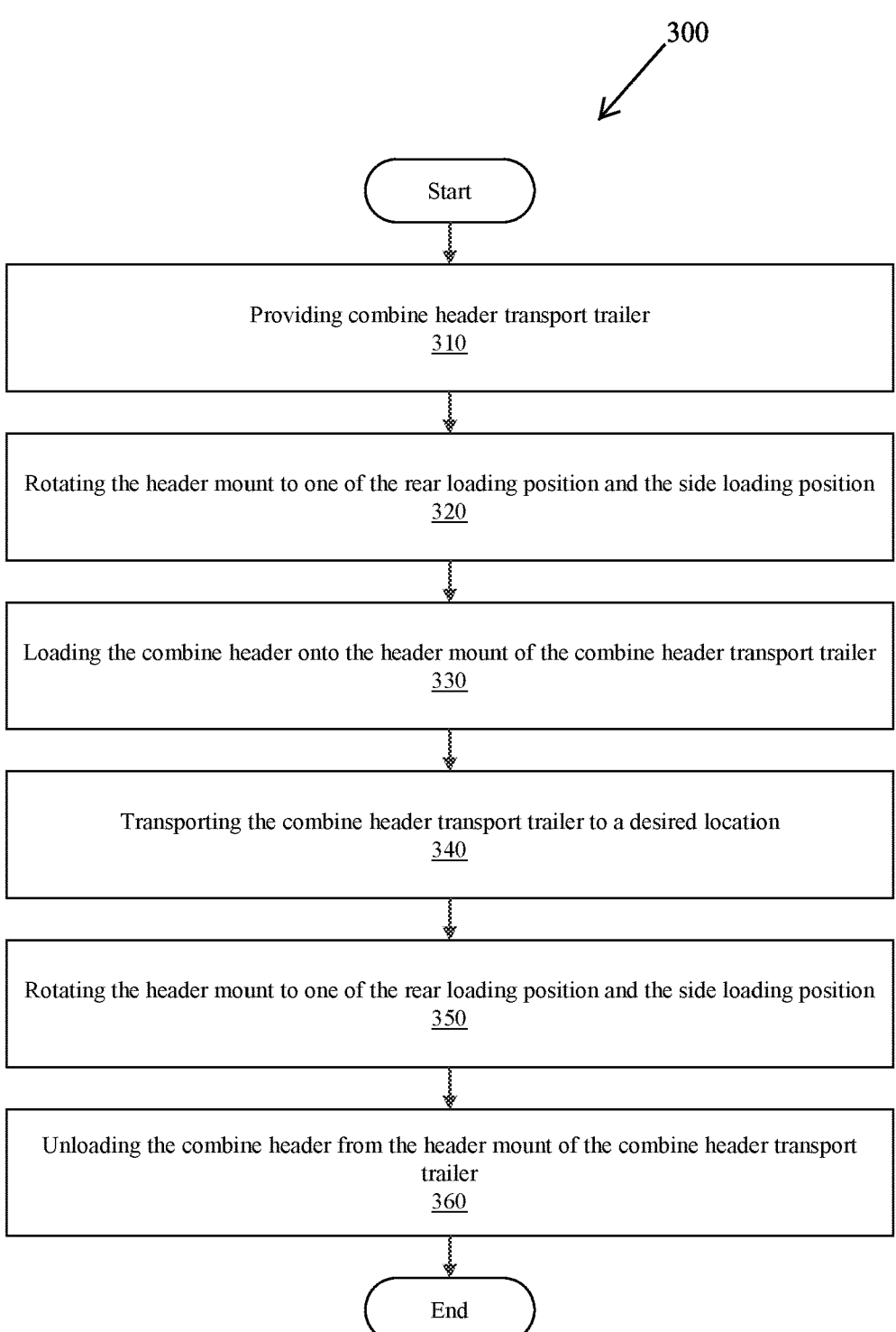

300

Start

Providing combine header transport trailer
310

Rotating the header mount to one of the rear loading position and the side loading position
320

Loading the combine header onto the header mount of the combine header transport trailer
330

Transporting the combine header transport trailer to a desired location
340

Rotating the header mount to one of the rear loading position and the side loading position
350

Unloading the combine header from the header mount of the combine header transport trailer
360

End

FIG. 3

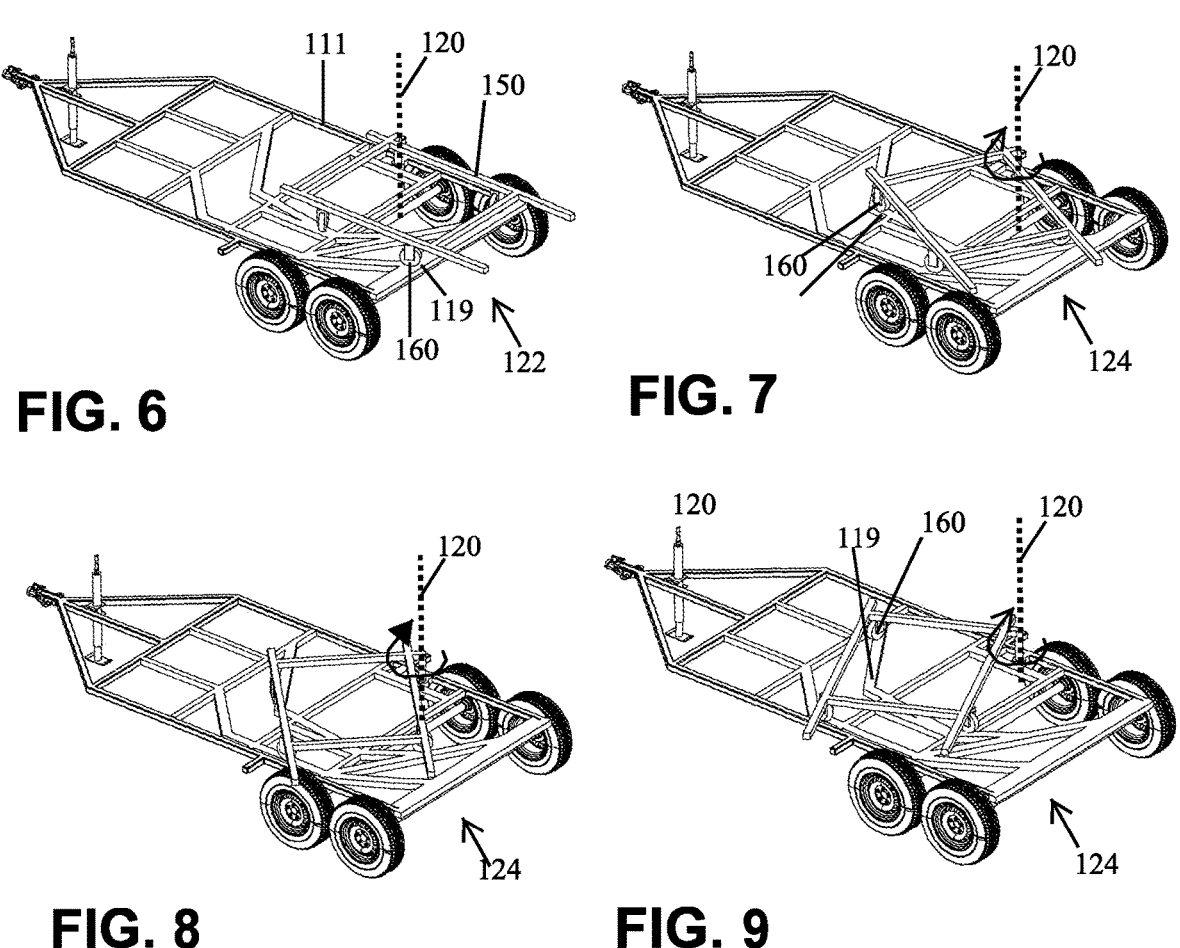
FIG. 6
FIG. 7
FIG. 8
FIG. 9
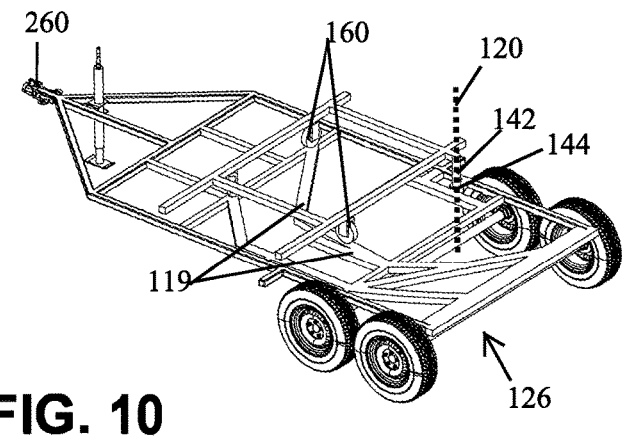
FIG. 10

PIVOTING COMBINE HEADER TRANSPORT TRAILER

CROSS-REFERENCE TO RELATED APPLICATIONS

This application claims the benefit of U.S. Provisional Application No. 63/313,406, filed on Feb. 24, 2022. The entire disclosure of the above application is hereby incorporated herein by reference.

FIELD

The present disclosure relates to transport trailers and, more particularly, to transport trailers for transporting a combine header.

INTRODUCTION

This section provides background information related to the present disclosure which is not necessarily prior art.

Combine harvesters are farm equipment that is generally equipped with a combine header that assists with the harvesting of a variety of crops like corn, wheat, oats, barley, and rice. Combine headers come in a range of sizes, depending on what the combine is used for or what crop is being harvested.

Transport trailers are commonly used to transport combine headers from one location to another when the combine header needs to be attached or detached from the combine. Traditional transport trailers only allow for loading and unloading the combine header from the side of the transport trailer. This means the combine header can only be transported in a manner such that the length of the combine header crosses the road, instead of being in line with the road. This makes transportation difficult and can block the road.

Further, the only way to attach the combine header to the combine harvester is by positioning the transport trailer, which is loaded with the combine header, close enough to the front of the combine harvester. This often involves backing up and aligning the side of the transport trailer so it is close enough to the front of the combine harvester to attach the combine header correctly. Since combine headers are often attached and detached in the field, it is difficult to maneuver the side of the transport trailer up to the front of the combine header without causing unnecessary crop damage.

Accordingly, there is a continuing need for a combine header transport trailer for transporting combine headers that eases transport and reduces unnecessary crop damage, by permitting loading from and pivoting between a rear loading position and a side loading position. Desirably, the combine header transport trailer could unload from the rear, and could back up to align with the combine header so that less maneuvering is required and there is less risk of crop damage.

SUMMARY

In concordance with the instant disclosure, a combine header transport trailer for transporting combine headers that eases transport and reduces unnecessary crop damage, by permitting loading from and pivoting between a rear loading position and a side loading position, and which could unload from the rear, and could back up to align with the combine header so that less maneuvering is required and there is less risk of crop damage, has surprisingly been discovered.

The present technology includes articles of manufacture, systems, and processes that relate to combine header transport trailers.

Embodiments of the present disclosure may include a combine header transport trailer that has a header cart with a frame, a vertical axis, a header mount, and a pivot body. In certain embodiments, a plurality of wheels is attached to and configured to transport the header cart.

In some embodiments, the frame may include a frame front, frame rear, frame first side and frame second side. The frame may further include a frame top side, a frame bottom side, and a frame inner area. The frame inner area is bounded by the frame front, the frame rear, the frame first side, and the frame top side. The inner area may also have at least one track. The header cart may also have a vertical axis adjacent the frame first side that is located between the frame front and the frame rear.

In certain embodiments, the header mount may be pivotally coupled to the frame of the header cart. The header mount may be configured to rotate about the vertical axis of the header cart between a rear loading position and a side loading position. Additionally, the header mount may be configured to rotate between a plurality of intermediate positions. The header mount may include a front support, a rear support, a first side support, and a second side support. Header mounts may further include a top side, and a bottom side. The bottom side may be spaced apart from the frame top side of the frame, which facilitates free rotation of the header mount.

In an additional embodiment of the header cart, the frame first side may be oriented on a first horizontal axis. The first side support of the header mount may be oriented on a second horizontal axis. The first horizontal axis of the frame may be spaced apart from the second horizontal axis of the header mount. When the header mount is in the rear loading position, the first horizontal axis of the frame may be arranged substantially parallel with the second horizontal axis of the header mount. When the header mount is in the side loading position, the first horizontal axis of the frame may be substantially orthogonal with the second horizontal axis of the header mount.

In another embodiment, the header cart includes a pivot body disposed between the header mount and the frame, and that at least partially supports the header mount atop the frame. The pivot body may permit the header mount to rotate about the vertical axis of the header cart. In certain embodiments, the pivot body may be defined by a pivot body shaft and a pivot body receiver that rotatably receives the pivot body shaft. In a most particular embodiment, the pivot body shaft may be disposed on the bottom side of the header mount, and the pivot body receiver may be disposed on the frame top side of the frame.

Certain embodiments of the combine header transport trailer may also include at least one caster wheel. The at least one caster wheel may be disposed between the top side of the frame and the bottom side of the header mount. The at least one caster wheel may be configured to movably support the header mount atop the header cart during rotation. In a most particular embodiment, the at least one caster wheel may be attached to the bottom side of the header mount. In such an embodiment, the at least one caster wheel is supported by the at least one track of the frame when the header mount rotates.

Further embodiments may include an actuator system configured to rotate the header mount between the rear loading position and the side loading position. There may also be a controller configured to communicate with the actuator system in operating the header mount. For example, the actuator system may be manual, hydraulic, pneumatic, or electric. In a most particular embodiment, the actuator may be electric, and the header cart may include an electrical power source in communication with the actuator system that is configured to operate an electric powered jack screw for rotating the header mount.

Additional embodiments may also include a coupling assembly disposed at the frame front of the frame of the header cart, the coupling assembly configured to selectively couple the header cart to a towing vehicle for the transport of the header cart.

Embodiments of the present disclosure may also include a method of transporting a combine header transport trailer. The method may include the step of providing a combine header transport trailer. The combine header transport trailer has a frame with a frame front, frame rear, frame first side and frame second side. The frame may further include a frame top side, a frame bottom side, and a frame inner area. The frame inner area is bounded by the frame front, the frame rear, the frame first side, and the frame top side. The inner area may also have at least one track. The header cart may also have a vertical axis adjacent to the frame first side that is located between the frame front and the frame rear. Further provided may be a plurality of wheels attached to and configured to transport the header cart. Additionally, there may be a header mount pivotally coupled to the frame of the header cart. The header mount may be configured to rotate about the vertical axis of the header cart between a rear loading position and a side loading position. The header mount may include a front support, a rear support, a first side support, and a second side support. The header mount may further include a top side, and a bottom side. The bottom side may be spaced apart from the frame top side of the frame, which facilitates free rotation of the header mount.

The method described in the present disclosure may include the steps of rotating the header mount to one of the rear loading position and the side loading position, and then loading the combine header onto the header mount of the combine header transport trailer. Next the steps of transporting the combine header transport trailer to a desired location, and rotating the header mount to one of the rear loading position and the side loading position. Additional steps may then include unloading the combine header from the header mount of the combine header transport, and installing the combine header onto a combine at the desired location.

In particular embodiments the method further includes a step of providing a header cart having an actuator system coupled to the header mount. Subsequently there may be a step of engaging the actuator system to rotate the header mount between the rear mounting position and the side mounting position.

In certain examples, the header cart for transporting a combine header is configured to pivot to permit the combine header to be loaded onto and unloaded from the header cart from different positions. In turn, the pivoting movements allow an operator, such as a farmer, to attach and detach the header cart to and from a combine or machine designed to harvest crops. It should be understood that the header cart is not limited to just transporting a combine header and that the header cart can be configured to transport any large machinery. In various examples, the header cart can be configured as a tandem axle trailer, farm wagon style running gear, or trailer with a tricycle style front to meet the preferences of the user, e.g., farmer.

In some examples, the header cart can include a frame having a front end, a rear end, and opposing sides. The header cart can be configured to be coupled to a towing vehicle (e.g., a truck) via a hitch assembly. As such, the front end of the frame can include a coupling assembly configured to engage a coupling member, such as a shaft mounted, ball type hitch disposed at the rear end of the towing vehicle.

The header cart can further include a header mount rotatably attached to the frame and configured to receive and support the combine header during transport, in particular embodiments. In one example, the header mount can include a plurality of bars. The header mount can be configured to pivot, relative to the frame, between a rear loading/unloading position, a side loading/unloading position, and an intermediate position, wherein the intermediate position can include any position between the rear loading/unloading position and side loading/unloading position. In other words, header mount can be configured to pivot, relative to the frame, between a rear mounting position, a side mounting position, and an intermediate mounting position, wherein the intermediate position can include any position between the rear mounting position and the side mounting position. The side loading/unloading position or mounting position can include a right side and a left side of the frame.

When the header mount is in the rear loading/unloading position, the combine header can be loaded/unloaded from the rear end of the frame. The header mount can pivot toward the side loading/unloading position thereby allowing the combine header to be loaded/unloaded from one of the opposing sides of the frame. Furthermore, the header mount can pivot into any position between the rear and side loading/unloading position thereby allowing the combine header to be loaded/unloaded to and from the header cart at a wide variety of angles. Advantageously, this permits attaching and detaching the combine header to/from the combine in challenging and/or tight spaces that would otherwise be difficult to maneuver.

In one example, the header cart can include a plurality of rollers with a pivot point positioned such that the weight of the combine header can be distributed to permit the header mount to pivot separate from frame. For example, the weight of the combine header can be forwardly distributed during transport thereby allowing the header mount to pivot about the frame.

In another example, the header cart can include a plurality of fixed caster wheels running along a platform with a pivot point positioned such that the weight is transferred forward for safer road transport, while at the same time positions the combine header rearward for rear loading. The header cart can include an electric powered jack screw to provide powered turning.

In other examples, the header mount can be hydraulically driven or manually operated.

The pivotal movement of the header mount provides the operator multiple position options for attaching the combine header to the combine. For example, having the header mount in the rear loading/unloading position allows inline loading thereby allowing the operator to maintain all equipment in a single lane of the road or one side of the road.

In another example, the header cart can further include a fore/aft adjuster for adjustment of the combine header location on the header cart. In this way, a remote can be disposed in a cab of the combine to assist with alignment for attaching the combine header to the combine. Electric actuators can be used in place of hydraulics, in this example.

Advantageously, the pivoting motion of the header cart permits horizontal positioning of the combine header for a more efficient means to attach/detach the combine header to/from the combine from the rear or the side of the header cart depending on the location of the combine. This reduces crop damage, allows for loading and unloading without blocking roadways, and saves valuable time.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a flowchart illustrating a method according to some embodiments of the present disclosure.

FIGS. 6-10 are side perspective views showing the combine header transport trailer arranged in a series of movements with the header mount being rotated from the rear loading position, through a plurality of intermediate loading positions, and to the side loading position, according to one embodiment of the disclosure.

DETAILED DESCRIPTION

Figure 1:
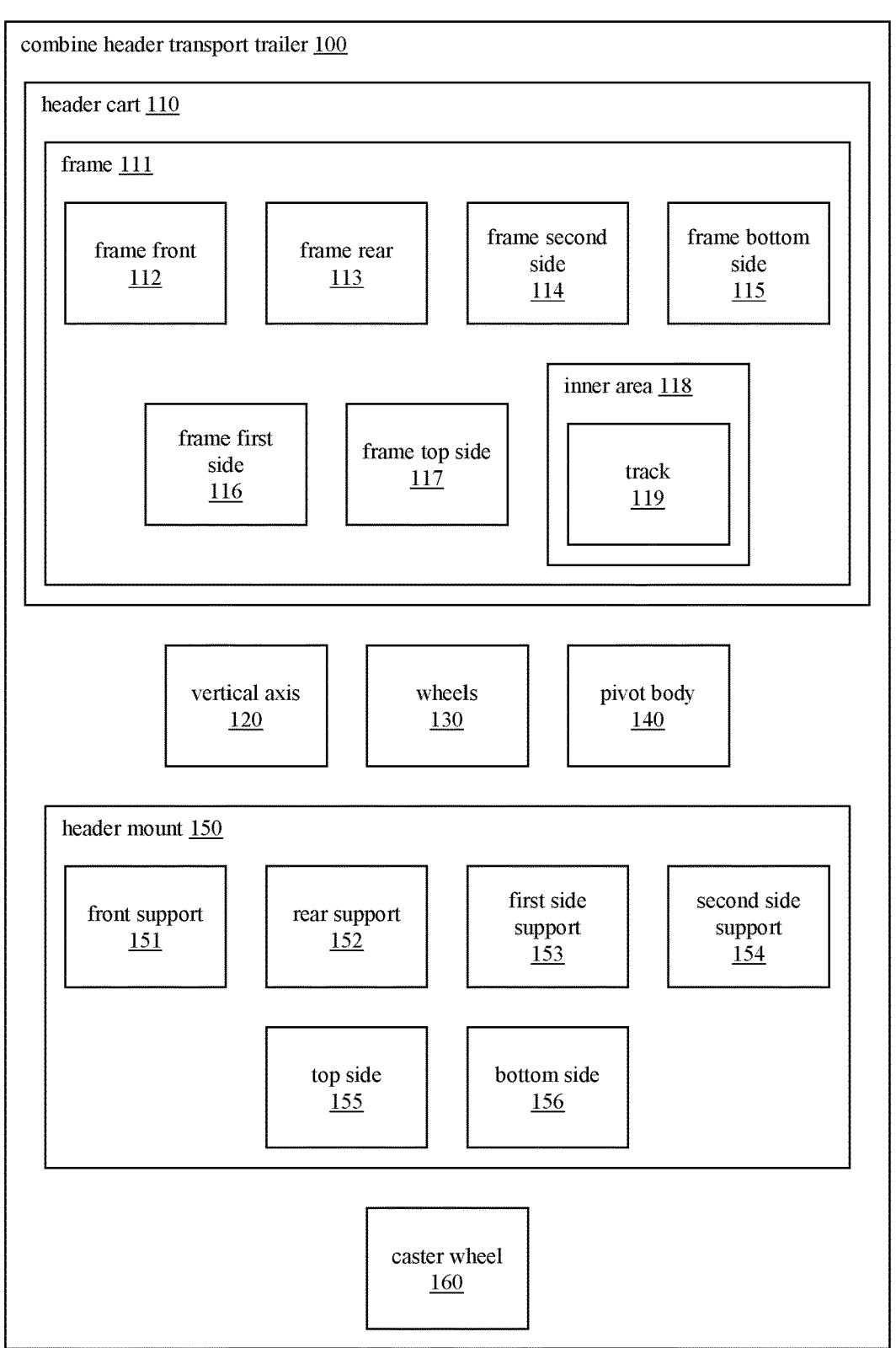
FIG. 1 is a block diagram illustrating a combine header transport trailer, according to some embodiments of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves on transport trailers and related methods for transporting combine headers to locations for installation on combine harvester farm equipment.

Figure 2:
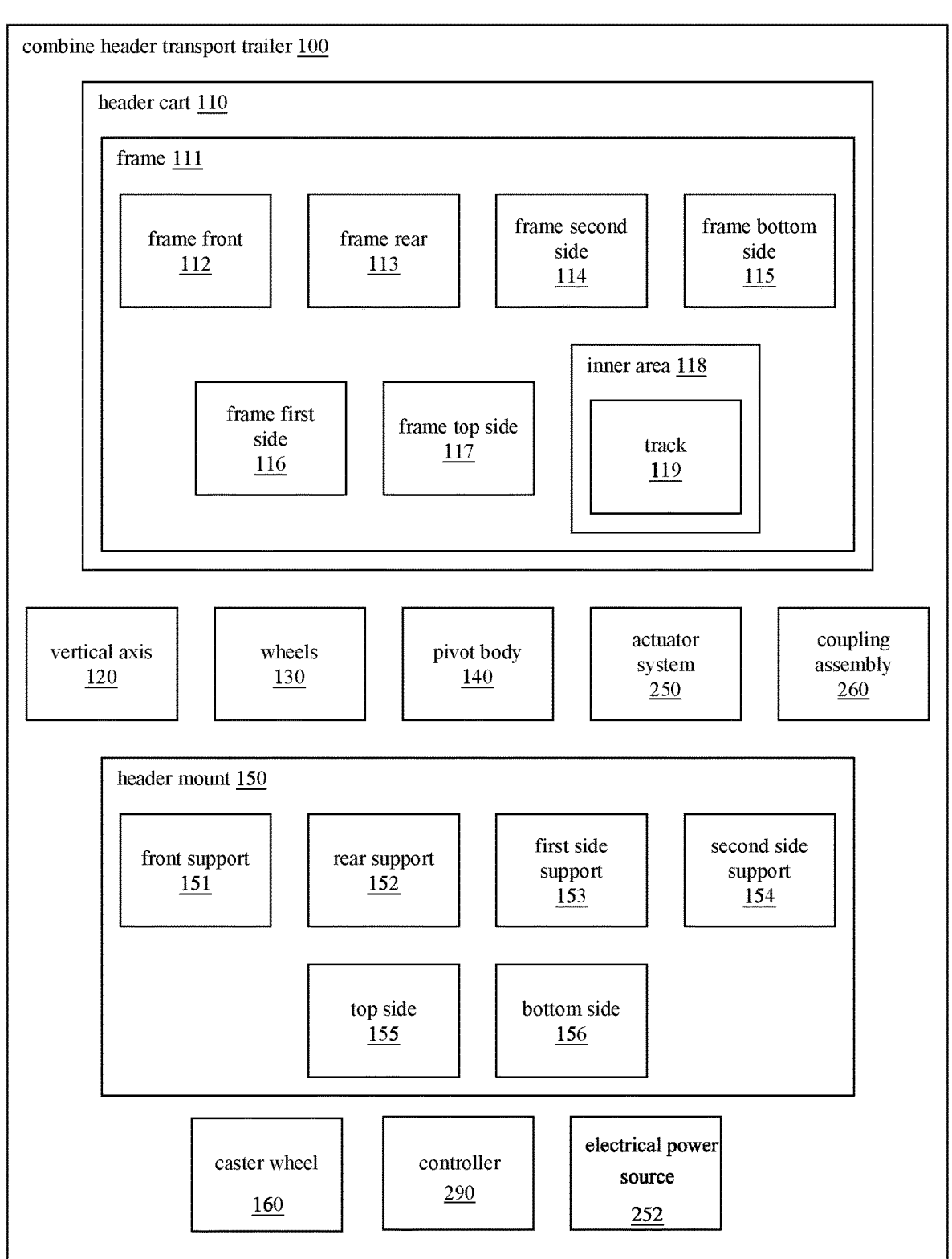
FIG. 2 is a block diagram illustrating a combine header transport trailer, according to further embodiments of the present disclosure.

FIGS. 1-2 are block diagrams that describe a combine header transport trailer 100, according to some embodiments of the present disclosure. In some embodiments, the combine header transport trailer 100 may include a header cart 110, a vertical axis 120, a header mount 150, and a pivot body 140. There may also be a plurality of wheels 130 attached to and configured to transport the header cart 110.

Figure 4:
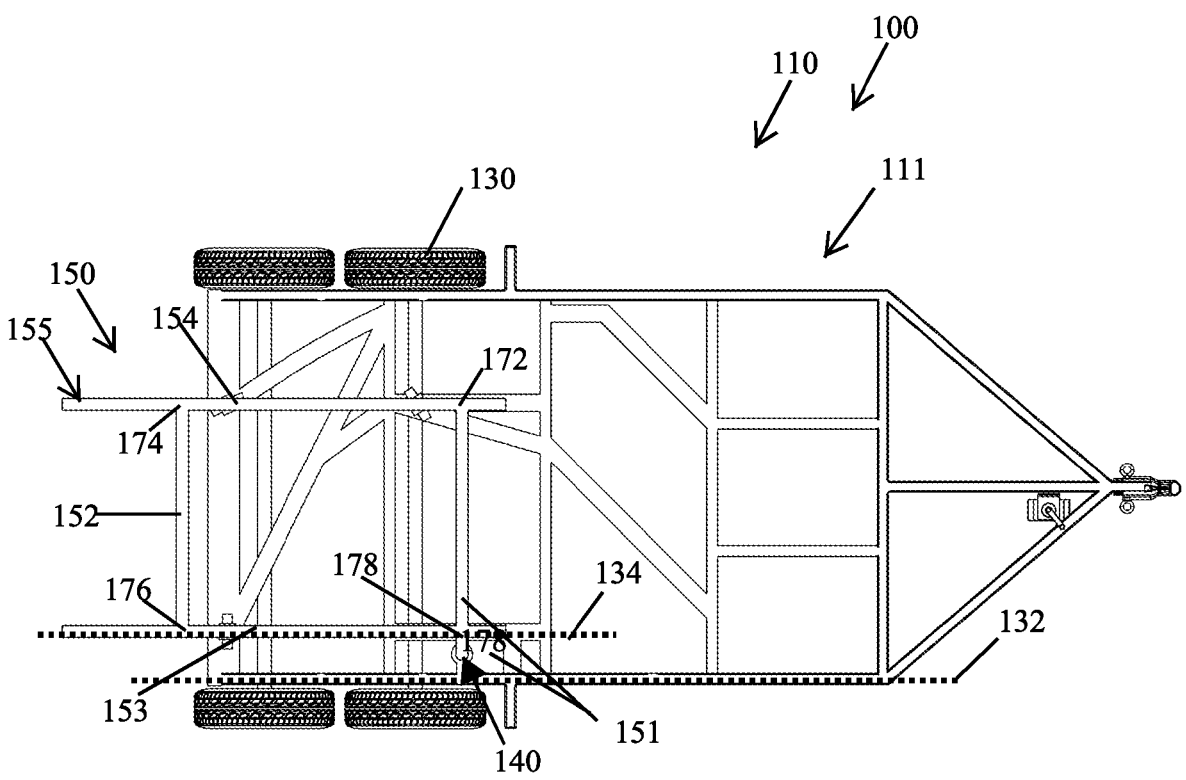
FIG. 4 is a top plan view of the combine header transport trailer in the rear loading position, according to one embodiment of the present disclosure.
Figure 14:
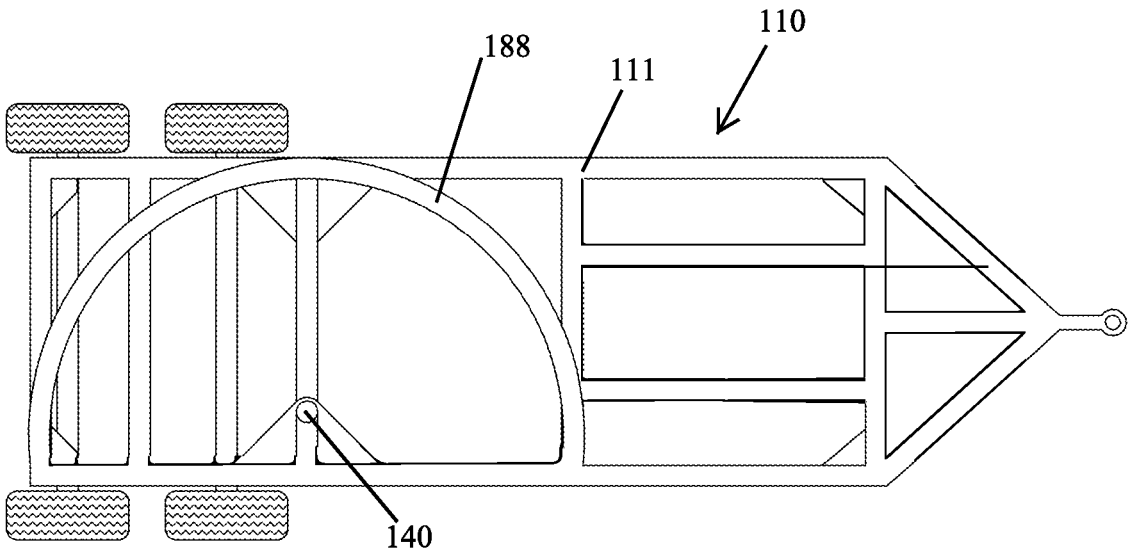
FIG. 14 is a top plan view of another embodiment of the combine header transport trailer having a different arrangement of tracks.

In certain embodiments, the header cart 110 may include a frame 111. The frame 111 may have a frame front 112, a frame rear 113, a frame first side 116, a frame second side 114. The frame 111 may further include a frame top side 117, a frame bottom side 115, and an inner area 118. The inner area 118 being bounded by the frame front 112, the frame rear 113, the frame first side 116, and the frame top side 117. FIGS. 4 and 14 show particular embodiments that have an inner area 118 including at least one track 119.

Some embodiments as shown in FIGS. 6-10, the header cart 110 may include a vertical axis 120 disposed adjacent to the frame first side 116, and located between the frame front 112 and the frame rear 113.

Figure 5:
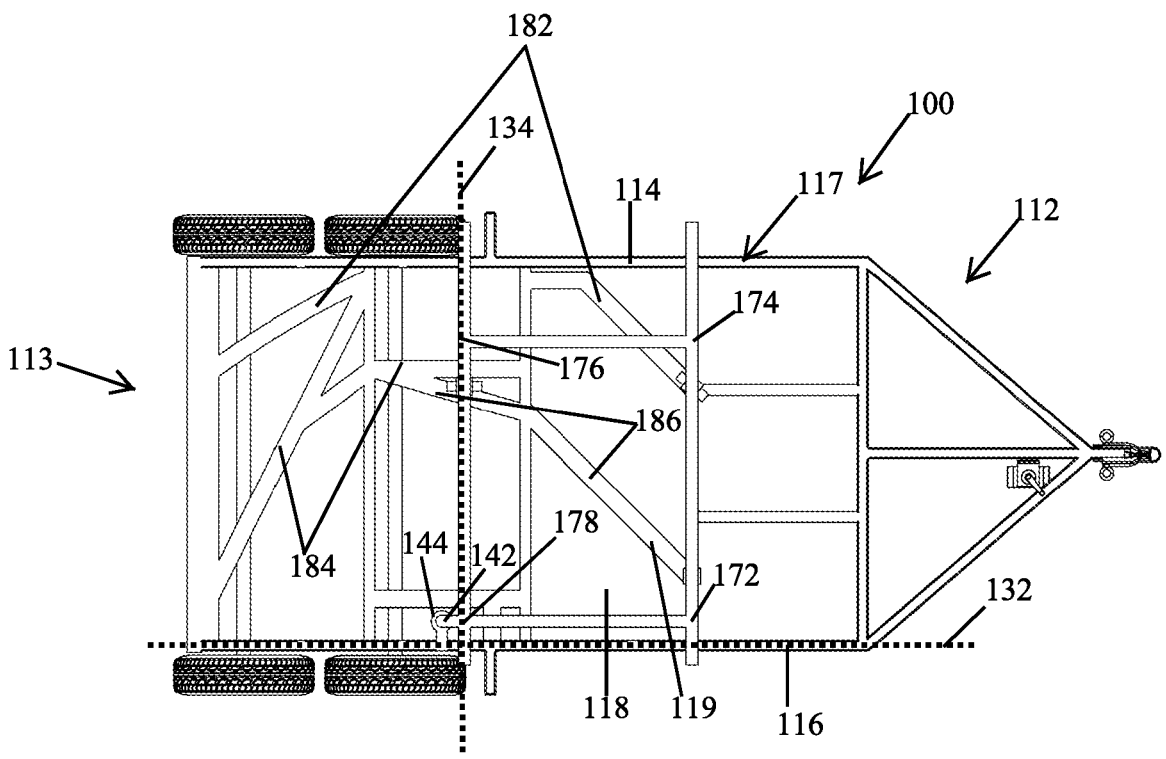
FIG. 5 is a top plan view of the combine header transport trailer in the side loading position, according to one embodiment of the present disclosure.

In additional embodiments, shown in FIGS. 4-5, the header mount 150 is pivotally coupled to frame 111 of the header cart 110. The header mount 150 may include a front support 151, a rear support 152, a first side support 153, and a second side support 154. The header mount may further include a top side 155, and a bottom side 156. The bottom side 156 of the header mount 150 may be spaced apart from the frame top side 117 of the frame 111 of the header cart 110 so that the header mount 150 can freely rotate. In a particular embodiment, as shown in FIGS. 6-10, the header mount 150 may be configured to rotate about the vertical axis 120 of the header cart 110, between a rear loading position 122, a plurality of intermediate positions 124, and side loading position 126.

In further embodiments, shown in FIGS. 6-10, the combine header transport trailer 100 may further include a pivot body 140. The pivot body 140 may be disposed between the header cart 110 and the header mount 150, and may permit the header mount 150 to rotate. In some embodiments, the pivot body 140 may partly support the header mount 150 atop the header cart 110, permitting the header mount 150 to rotate about the vertical axis 120 of the header cart 110. In certain embodiments, the pivot body 140 may be defined by a pivot body shaft 142 and a pivot body receiver 144. The pivot body shaft 142 may be rotatably disposed in the pivot body receiver. In a most particular embodiment, the pivot body shaft 142 may be disposed on the bottom side 156 of the header mount 150, and the pivot body receiver 144 may be disposed on the frame top side 117 of the frame 111.

Figures 11, 12:
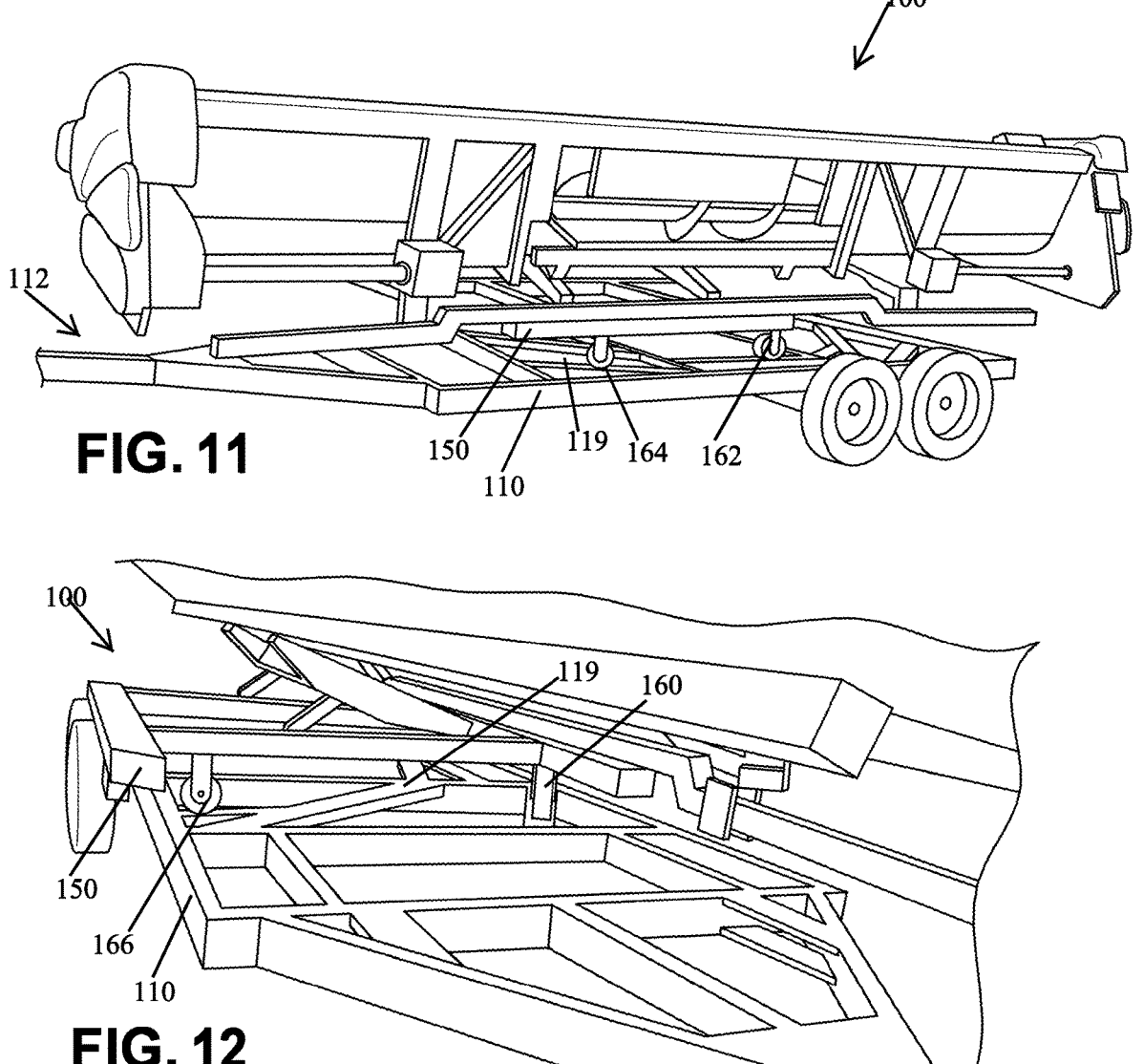
FIG. 11 is a side perspective view of the combine header transport trailer in use with a combine header, according to one embodiment of the disclosure.
FIG. 12 is a front perspective view of the combine header transport trailer shown in FIG. 11, and further illustrating an inner area of a header cart with tracks and wheel casters of the header mount disposed on the tracks.
Figure 13:
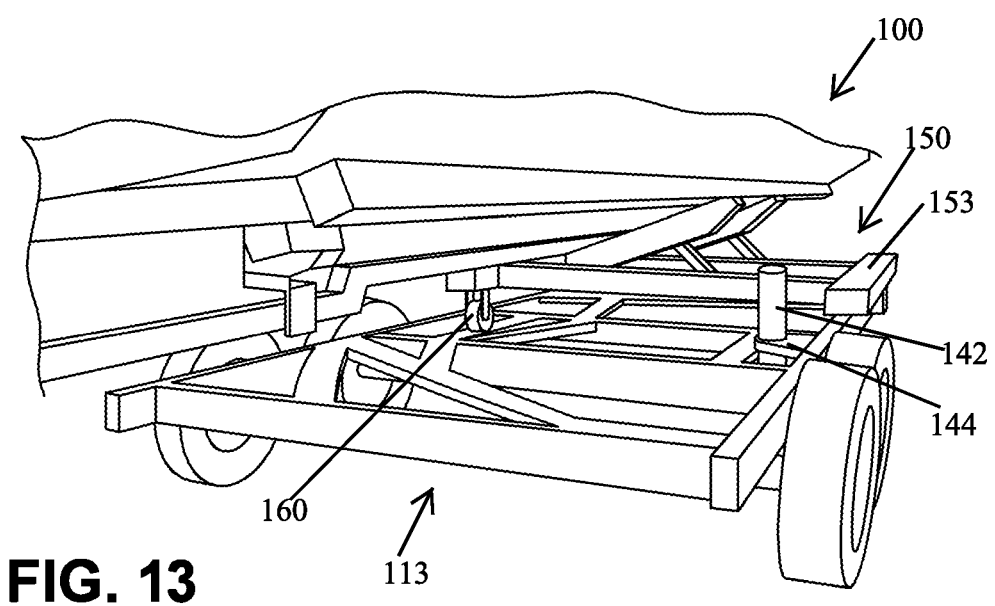
FIG. 13 is a rear perspective view of the combine header transport trailer shown in FIG. 11, and further illustrating the inner area of the header cart with the tracks and wheel casters of the header mount disposed on the tracks.

As shown in FIGS. 11-14, another embodiment of the header cart 110 may include at least one caster wheel 160 disposed between the frame 111 and the bottom side 156 of the header mount 150. The at least one caster wheel 160 may be configured to movably support the header mount 150 atop the frame 111 during rotation. In a most particular embodiment, the at least one caster wheel 160 may be disposed on the bottom side 156 of the header mount 150. Further, the at least one caster wheel 160 may align with the at least one track 119 of the inner area of the frame 111 so the at least one caster wheel 160 is supported during rotation, as shown in FIGS. 11-13.

In some embodiments of the header cart 110, as shown in FIGS. 4-5, the frame first side 116 may be oriented in a first horizontal axis 132. Additionally, the first side support 153 of the header mount 150 may be oriented on a second horizontal axis 134 that is spaced apart from the first horizontal axis. In a specific embodiment, as shown in FIGS. 4 and 6, the header mount 150 may be in the rear loading position 122 when the second horizontal axis 134 is arranged substantially parallel with the first horizontal axis 132. As shown in FIGS. 5 and 10, the header mount 150 may be in the side loading position 126 when the second horizontal axis 134 is arranged substantially orthogonal to the first horizontal axis 132.

In a most particular embodiment, as shown in FIGS. 4-5, the header mount 150 of the combine header transport trailer 100 may be rectangular in shape, and the frame 111 of the header cart 110 may be partially rectangular in shape. The rear loading position 122 may be defined by parallel alignment of the first side support 153 with the frame first side 116, and by parallel alignment of the rear support 152 with the frame rear 113. The side loading position 126 may be defined by parallel alignment of the front support 151 with the frame rear 113.

In another embodiment, with continued reference to FIGS. 4-5, the header mount 150 may be rectangular in shape and include a first corner 172 connecting the front support 151 to the second side support 154. There may be a second corner 174 connecting the second side support 154 to the rear support 152. There may be a third corner 176 connecting the rear support 152 to the first side support 153, and there may be a fourth corner 178 connecting the first side support 153 to the front support 151. The pivot body 140 may be disposed adjacent the fourth corner 178, as shown in FIGS. 4-5. There may be a first caster wheel 162 disposed on the bottom side 156 of the header mount 150 and adjacent the first corner 172. There may be a second caster wheel 164 disposed on the bottom side 156 of the header mount 150 and adjacent the second corner 174. There may be a third caster wheel 166 disposed on the bottom side 156 of the header mount 150 adjacent the third corner 176.

As shown in FIG. 4, the frame 111 of the header cart 110 may include a first track 182, a second track 184, and a third track 186 each traversing the inner area 118. When the header mount 150 rotates about the vertical axis 120 of the header cart 110, the first caster wheel 162 may be supported and guided by the first track 182. The second caster wheel 164 and the third caster wheel 166 may be supported and guided by the second track 184 and the third track 186 respectively, as shown in FIGS. 11-13.

In another embodiment, as shown in FIG. 14, the header cart 110 may only have a semi-circular track 188. The header mount 150 may have a single caster wheel 168 disposed on the bottom side 156. The single caster wheel 168 may be supported and guided by the semi-circular track 188 as the header mount 150 rotates.

Additional embodiments of the header cart 110 further include a coupling assembly 260 disposed at the frame front 112. The coupling assembly 260 may be configured to selectively couple the header cart 110 to a towing vehicle for transport.

FIG. 2 shows a certain embodiment with a header cart 110 including an actuator system 250 and a controller 290. The controller 290 may be in communication with the actuator system 250. The actuator system 250 and controller 290 may be configured to rotate the header mount 150 about the vertical axis 120 of the header cart 110 between the rear loading position 122 and side loading position 126. The actuator system 250 may be one of manual, hydraulic, pneumatic, and electric. In a most particular embodiment, the header cart 110 includes an electrical power source 252 in communication with the actuator system 250. The actuator system 250 may be in further communication with an electric powered jack screw to rotate the header mount 150 of the combine header transport trailer 100. One of ordinary skill in the art may also select other suitable types or mechanisms of the actuator system 250 within the scope of the present disclosure.

FIG. 3 is a flowchart describing a method 300 according to some embodiments of the present disclosure. As shown, the method 300 may include a series of steps 310 to 360. A first step 310 may include providing a combine header transport trailer 100 with a header cart 110, a vertical axis 120, a header mount 150, a pivot body 140, and a plurality of wheels 130. A second step 320 may include rotating the header mount 150 to one of a rear loading position 122 and a side loading position 126. Following the second step 320, a third step 330 may include loading the combine header onto the header mount 150 of the combine header transport trailer 100. The method 300 may further include a fourth step 340 of transporting the combine header transport trailer 100 to a desired location. Further, a fifth step 350 of the method 300 may include rotating the header mount 150 to one of the rear loading position 122 and the side loading position 126. A sixth step 360 may include unloading the combine header from the header mount 150 of the combine header transport trailer 100.

Advantageously, the combine header transport trailer 100 and the method 300 as described hereinabove for transporting combine headers has been found to ease transport and reduce unnecessary crop damage. The combine header transport trailer 100 and the method 300 permit loading from and pivoting between the rear loading position 122 and the side loading position 126, and beneficially permit for an unload from the rear. The combine header transport trailer 100 and the method 300 further allow for the combine header transport trailer 100 to back up to align with the combine header so that less maneuvering is required and there is less risk of crop damage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A pivoting combine header transport trailer, comprising:

a header cart including a frame with a frame front, a frame rear, a frame first side, a frame second side, a frame top side, and a frame bottom side, the frame further having an inner area bounded by the frame front, the frame rear, the frame first side, and the frame top side, and the header cart further having a vertical axis located between the frame front and the frame rear and adjacent the frame first side;

a plurality of wheels and an axle attached to and configured for transport of the header cart; and a header mount pivotally coupled to the frame of the header cart at a pivot point located between the frame front and the axle, the header mount including a front support, a rear support, a first side support, a second side support, a top side, and a bottom side, the bottom side of the header mount spaced apart from the frame top side of the header cart, and the header mount configured to rotate about the vertical axis between a rear loading position and a side loading position;

wherein the axle includes a first axle and a second axle, the pivot point disposed between the frame front and the first axle and the second axle.

2. The pivoting combine header transport trailer of claim 1, wherein the pivot point includes a pivot body disposed between the header cart and the header mount, the pivot body at least partly supporting the header mount on the header cart and permitting the header mount to rotate about the vertical axis.

3. The pivoting combine header transport trailer of claim 2, wherein the pivot body is defined by a pivot body shaft and a pivot body receiver, the pivot body shaft rotatably disposed in the pivot body receiver.

4. The pivoting combine header transport trailer of claim 3, wherein the pivot body shaft is disposed on the bottom side of the header mount, and the pivot body receiver is disposed on the frame top side of the header cart.

5. The pivoting combine header transport trailer of claim 4, wherein the pivot body shaft freely rotates inside the pivot body receiver about the vertical axis of the frame.

6. The pivoting combine header transport trailer of claim 1, wherein the frame first side of the header cart is oriented on a first horizontal axis and the first side support of the header mount is oriented on a second horizontal axis, the first horizontal axis spaced apart from the second horizontal axis.

7. The pivoting combine header transport trailer of claim 6, wherein the first horizontal axis is arranged substantially parallel with the second horizontal axis where the header mount is in the rear loading position.

8. The pivoting combine header transport trailer of claim 6, wherein the first horizontal axis is arranged substantially orthogonal with the second horizontal axis where the header mount is in the side loading position.

9. The pivoting combine header transport trailer of claim 1, wherein the header mount is further configured to rotate about the vertical axis to one of a plurality of intermediate positions between the rear loading position and the side loading position.

10. The pivoting combine header transport trailer of claim 1, further comprising at least one caster wheel disposed between the frame top side of the header cart and the bottom side of the header mount, the at least one caster wheel configured to further movably support the header mount atop the header cart.

11. The pivoting combine header transport trailer of claim 10, wherein the inner area of the frame of the header cart further has at least one track, and the at least one caster wheel is disposed on the bottom side of the header mount, and the at least one track receives the at least one caster wheel.

12. The pivoting combine header transport trailer of claim 1, further comprising an actuator system configured to rotate the header mount about the vertical axis between the rear loading position and the side loading position.

13. The pivoting combine header transport trailer of claim 12, wherein the actuator system is one of manual, hydraulic, pneumatic, and electric.

14. The pivoting combine header transport trailer of claim 13, further comprising an electrical power source in communication with the actuator system, and the actuator system is electric including an electric powered jack screw.

15. The pivoting combine header transport trailer of claim 12, further comprising a controller in communication with the actuator system, the controller configured to cause the actuator system to rotate the header mount about the vertical axis between the rear loading position and the side loading position.

16. The pivoting combine header transport trailer of claim 1, further comprising a coupling assembly disposed at the frame front of the frame of the header cart, the coupling assembly configured to selectively couple the header cart to a towing vehicle for the transport of the header cart.

17. A pivoting combine header transport trailer, comprising:

a header cart including a frame with a frame front, a frame rear, a frame first side, a frame second side, a frame top side, and a frame bottom side, the frame further having an inner area bounded by the frame front, the frame rear, the frame first side, and the frame top side, and the inner area of the frame of the header cart further having at least one track, a vertical axis located between the frame front and the frame rear and adjacent the frame first side;

a plurality of wheels and an axle attached to and configured for transport of the header cart; and a header mount pivotally coupled to the frame of the header cart at a pivot point located between the frame front and the axle, the header mount including a front support, a rear support, a first side support, a second side support, a top side, and a bottom side, the bottom side of the header mount spaced apart from the frame top side of the header cart, the header mount configured to rotate about the vertical axis between a rear loading position and a side loading position, wherein the header mount is further configured to rotate about the vertical axis to one of a plurality of intermediate positions between the rear loading position and the side loading position, wherein the frame first side of the header cart is oriented in a first horizontal axis and the first side support of the header mount is oriented on a second horizontal axis, the first horizontal axis spaced apart from the second horizontal axis, wherein the first horizontal axis is arranged substantially parallel with the second horizontal axis where the header mount is in the rear loading position, and wherein the first horizontal axis is arranged substantially orthogonal with the second horizontal axis where the header mount is in the side loading position;

a pivot body disposed between the header cart and the header mount, the pivot body at least partly supporting the header mount on the header cart and permitting the header mount to rotate about the vertical axis, wherein the pivot body is defined by a pivot body shaft and a pivot body receiver, the pivot body shaft rotatably disposed in the pivot body receiver, wherein the pivot body shaft is disposed on the bottom side of the header mount, and the pivot body receiver is disposed on the frame top side of the header cart, and wherein the pivot body shaft freely rotates inside the pivot body receiver about the vertical axis of the frame;

at least one caster wheel disposed between the frame top side of the header cart and the bottom side of the header mount, the at least one caster wheel configured to further movably support the header mount atop the header cart, and wherein the at least one caster wheel is disposed on the bottom side of the header mount, and the at least one track receives the at least one caster wheel, the at least one track receiving the at least one caster wheel; and a coupling assembly disposed at the frame front of the frame of the header cart, the coupling assembly configured to selectively couple the header cart to a towing vehicle for the transport of the header cart;

wherein the axle includes a first axle and a second axle, the pivot point disposed between the frame front and the first axle and the second axle.

18. A method transporting a combine header, the method comprising steps of:

providing a combine header transport trailer, including a header cart including a frame with a frame front, a frame rear, a frame first side, a frame second side, a frame top side, and a frame bottom side, the frame further having an inner area bounded by the frame front, the frame rear, the frame first side, and the frame top side, and the header cart further having a vertical axis located between the frame front and the frame rear and adjacent the frame first side, a plurality of wheels and an axle attached to and configured for transport of the header cart, and a header mount pivotally coupled to the frame of the header cart at a pivot point located between the frame front and the axle, the header mount including a front support, a rear support, a first side support, a second side support, a top side, and a bottom side, the bottom side of the header mount spaced apart from the frame top side of the header cart, the header mount configured to rotate about the vertical axis between a rear loading position and a side loading position, wherein the axle includes a first axle and a second axle, the pivot point disposed between the frame front and the first axle and the second axle;

rotating the header mount to one of the rear loading position and the side loading position;

loading the combine header onto the header mount of the combine header transport trailer;

transporting the combine header transport trailer to a desired location;

rotating the header mount to one of the rear loading position and the side loading position; and unloading the combine header from the header mount of the combine header transport trailer.

19. The method of claim 18, further comprising a step of installing the combine header onto a combine harvester at the desired location.

* * * * *